C. A. MAUS.
Liquid Cooler.
No. 200,925.  Patented March 5, 1878.
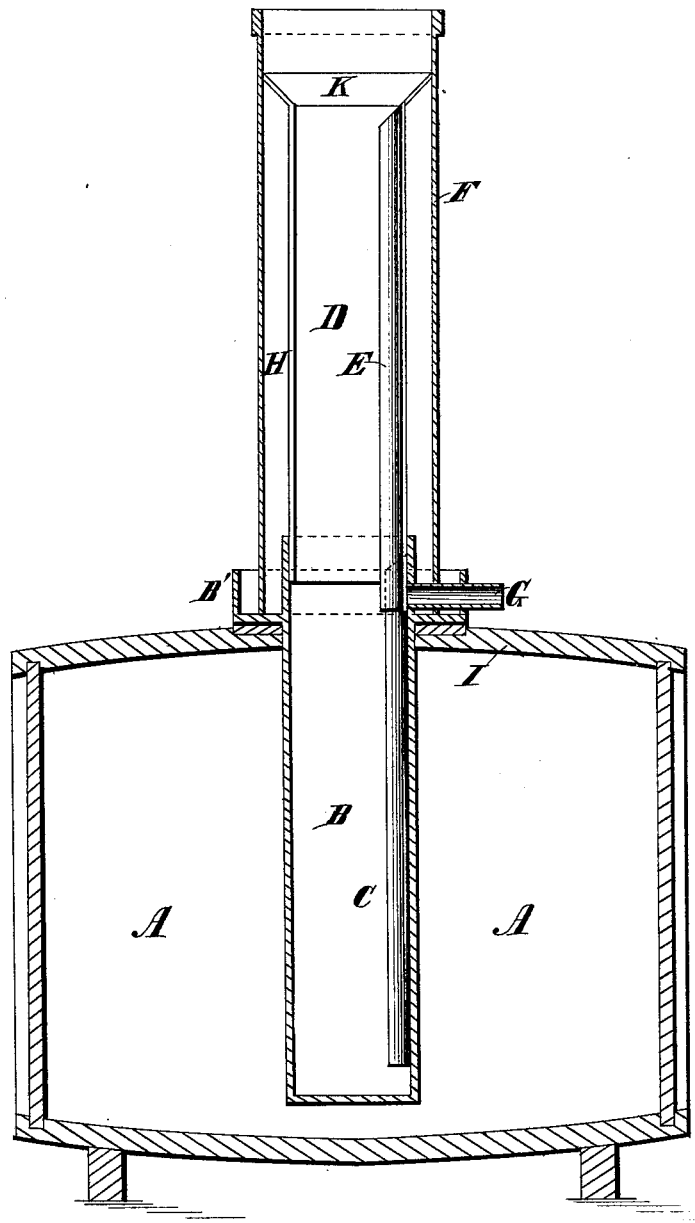
Attest.
John E. Bauman.
John E. Erl.
Inventor:
Clement Albert Maus

UNITED STATES PATENT OFFICE.

CLEMENT A. MAUS, OF NASHVILLE, TENNESSEE.

IMPROVEMENT IN LIQUID-COOLERS.

Specification forming part of Letters Patent No. 200,925, dated March 5, 1878; application filed October 12, 1877.

*To all whom it may concern:*

Be it known that I, CLEMENT A. MAUS, of Nashville, State of Tennessee, have invented an Apparatus for Economically and Quickly Cooling Beer and other Liquids, of which the following is a specification:

The object of my invention is to rapidly and economically cool down the liquid contents of beer and other casks and packages to any required temperature by the application of ice or other cold compounds into the body of the liquid without mixing with it or reducing the pressure under which it is working, as is more fully illustrated in the accompanying drawing.

The drawing is a vertical section through the center of the apparatus and cask, in which—

A A represent a cask in which is contained the beer or other liquid to be cooled. I represents a metal flange, which is securely bolted and fastened with a perfectly tight joint to the cask or other receptacle containing the liquid. This flange I has an opening in it large enough to admit the introduction of the cooler-pipe B, which has its lower end closed, and extends nearly down to the bottom of the cask A A.

On the inside of the pipe B is inserted or fastened a small pipe or hose, C, open at its lower end, and extending nearly to the bottom of the pipe B, and closed at its top or upper end, where it forms a tight connection with the small pipe G, extending from the pipe C through the insulating-pipe F and cup-shaped flange B'. This pipe G is open at its outer end.

Near the top end of the pipe B is securely fastened a cup-shaped flange, B', which serves the double purpose of fastening the pipe B to the flange I, and having inserted a gum or other gasket between B' and I. A perfectly tight joint is formed between these flanges. The cup-shaped flange B' also serves to hold water or other liquid to form a water-packing joint for the bottom end of the insulating-pipe F, which surrounds with a stratum of air the feeder-pipe D, which is a continuation of the cooler-pipe B, and is connected to it by a slip-joint. This feeder-pipe D is made smaller at the top end than it is at the bottom, so that the ice will more readily settle down into the cooler-pipe B.

Inside the feeder-pipe D is a shield, E, extending the whole length of the pipe D, and fitted over and covering the upper end of the pipe C, the object being to prevent the ice or other compound from lodging on the end of the pipe C, and preventing it from going to the bottom of the cooler-pipe B.

On the upper end of the pipe D is a funnel-shaped flange, K, which fits tightly to the inside of the insulating-pipe F near its upper end, to form the air-space H around the feeder-pipe D, to prevent the melting of the ice from radiation.

Having made the connections of the different parts, as described, with the cask or other receptacle, and having placed the insulating-pipe F around the feeder-pipe D, and filled the cup-shaped flange B' with water or other liquid to seal the air-space H, the operation is as follows: Fill the cooler-pipe B, and also the feeder-pipe D, with ice or other freezing-mixture to the top of the feeder-pipe D, and as the ice melts by being in contact in the pipe B with the liquid in the cask A A, it gradually settles down in the pipe B, and what water is produced by the melting of the ice will be discharged through the pipe C and its connecting-pipe G, and from this point it can either be dripped over the outside of the cask A A, and thus help to reduce the temperature by evaporation, or it can be led away and discharged in a vessel to receive it.

By this direct application into the cask the outside atmosphere has very little effect on the temperature of the beer. It cools more effectively, saves ice and labor, and the temperature of the beer or other liquid is completely under control. The brewer is thereby enabled to give free access to the outside atmosphere into the cellar, or wherever the beer is kept or fermented, and thus always have pure air; hence the beer will be better and more uniform, and the cellar can be kept perfectly clean.

Having thus fully described my apparatus and its operation, I claim as my invention—

The combination of the cooler-pipe B, with its cup-shaped flange B' and the discharge-pipes C and G, the feeder-pipe D, with its shield E and funnel-shaped flange K, and the insulating-pipe F, substantially as and for the purpose specified.

C. A. MAUS.

Witnesses:
JOHN E. BAUMAN,
JOHN E. ERB.